(12) United States Patent
Levin (10) Patent No.: US 7,711,736 B2
(45) Date of Patent: May 4, 2010

(54) DETECTION OF ATTRIBUTES IN UNSTRUCTURED DATA

(75) Inventor: Boris I. Levin, Rishon-Le-Zion (IL)

(73) Assignee: Microsoft International Holdings B.V., Amsterdam (NL)

( * ) Notice: Subject to any disclaimer, the term of this patent is extended or adjusted under 35 U.S.C. 154(b) by 397 days.

(21) Appl. No.: 11/809,167

(22) Filed: May 31, 2007

(65) Prior Publication Data

US 2007/0299855 A1 Dec. 27, 2007

Related U.S. Application Data

(60) Provisional application No. 60/815,623, filed on Jun. 21, 2006.

(51) Int. Cl.
*G06F 7/00* (2006.01)
*G06F 17/30* (2006.01)
(52) U.S. Cl. .................... 707/737; 707/750
(58) Field of Classification Search ............. 707/1–3, 707/5, 100–102, 205; 704/5, 10
See application file for complete search history.

(56) References Cited

U.S. PATENT DOCUMENTS

| | | | |
|---|---|---|---|
| 5,251,131 A | | 10/1993 | Masand et al. |
| 6,092,038 A | * | 7/2000 | Kanevsky et al. ............. 704/9 |
| 6,304,864 B1 | * | 10/2001 | Liddy et al. .................. 706/15 |
| 6,393,427 B1 | | 5/2002 | Vu et al. |
| 6,751,600 B1 | | 6/2004 | Wolin |
| 7,260,568 B2 | * | 8/2007 | Zhang et al. .................. 707/3 |
| 7,386,442 B2 | * | 6/2008 | Dehlinger et al. ............ 704/10 |
| 2005/0108001 A1 | * | 5/2005 | Aarskog ...................... 704/10 |
| 2005/0114368 A1 | * | 5/2005 | Gould et al. ................ 707/100 |
| 2005/0149546 A1 | | 7/2005 | Prakash et al. |
| 2005/0198026 A1 | * | 9/2005 | Dehlinger et al. ............ 707/5 |
| 2007/0156749 A1 | | 7/2007 | Levin |
| 2007/0282827 A1 | | 12/2007 | Levin |

OTHER PUBLICATIONS

U.S. Appl. No. 60/756,150.
U.S. Appl. No. 60/756,139.
U.S. Appl. No. 60/815,623.
Zoomix, Self-Learning Matching Technology, by Dr. Boris Levin, et al., Jul. 2006.
http://www.zoomix.com/mdq.asp.

* cited by examiner

*Primary Examiner*—Don Wong
*Assistant Examiner*—Merilyn P Nguyen
(74) *Attorney, Agent, or Firm*—Wolf, Greenfield & Sacks, P.C.

(57) ABSTRACT

A method for processing information includes receiving a set of records, which include a plurality of fields containing data regarding respective items, and selecting a field that occurs in all of the records and contains multiple terms in each of the records. At least first and second terms that occur among the terms in the selected field in the records are identified, such that the records are partitioned into at least first and second respective subsets by occurrences of the at least first and second terms in the selected field. Responsively to partitioning of the records by the occurrences, it is determined that the at least first and second terms correspond to at least first and second different values of an attribute of the items. The data are classified according to the values of the attribute.

16 Claims, 3 Drawing Sheets

DETECTION OF ATTRIBUTES IN UNSTRUCTURED DATA

CROSS-REFERENCE TO RELATED APPLICATION

This application claims the benefit of U.S. Provisional Patent Application 60/815,623, filed Jun. 21, 2006, which is incorporated herein by reference.

FIELD OF THE INVENTION

The present invention relates generally to data processing, and specifically to methods and systems for extracting information from collections of data.

BACKGROUND OF THE INVENTION

Companies and other organizations commonly maintain large quantities of data in different databases and in different formats (even within the same database). Data mastering—compiling diverse data into a single, unified database while eliminating duplication and errors—has become increasingly important in ensuring data quality and accessibility. A number of software-based tools are available for automated data mastering, such as Zoomix ONE, produced by Zoomix Data Mastering Ltd. (Jerusalem, Israel).

One of the challenges of data mastering is to convert unorganized text into orderly sets of attributes and values. For example, records in an enterprise database corresponding to different products may each contain a list of terms describing the corresponding product without indicating the product attribute that each term identifies. (For example, a "description" field of the record may contain the terms "lamp," "large" and "yellow," listed as free text, without specifying that these terms are values of the respective attributes "product type," "size," "color," etc.) Normalization of the records—i.e., associating the terms with a common, standardized set of attributes—is important in enabling applications to search the records efficiently, as well as in data cleansing (detection and correction of data errors) and categorization.

SUMMARY OF THE INVENTION

The embodiments of the present invention that are described hereinbelow provide methods, systems and software for converting unstructured textual description into structured sets of attributes and corresponding values. These embodiments use set covering techniques to identify the different terms in a group of records that correspond to values of the same attribute. By solving the covering problem a number of times over the terms in the group of records, multiple attributes can be identified, and the terms may then be sorted and classified automatically according to these attributes.

There is therefore provided, in accordance with an embodiment of the present invention, a method for processing information, including:

receiving a set of records, which include a plurality of fields containing data regarding respective items;

selecting a field that occurs in all of the records and contains multiple terms in each of the records;

identifying at least first and second terms that occur among the terms in the selected field in the records, such that the records are partitioned into at least first and second respective subsets by occurrences of the at least first and second terms in the selected field;

determining, responsively to partitioning of the records by the occurrences, that the at least first and second terms correspond to at least first and second different values of an attribute of the items; and classifying the data according to the values of the attribute and outputting the classified data.

Typically, identifying the at least first and second terms includes identifying a group of the terms that occur with at least a predetermined frequency among the records such that the terms in the group optimally partition the records in the set. In a disclosed embodiment, identifying the group includes computing a metric that increases in response to a union of the subsets and decreases in response to an intersection of the subsets, and selecting the terms to add to the group so as to maximize the metric.

In some embodiments, identifying the at least first and second terms includes identifying a first group of the terms that are associated with a first attribute of the items, and the method includes, after identifying the first group, identifying a second group of the terms, which is disjoint from the first group and partitions the records into different respective subsets from the terms in the first group, and determining that the terms in the second group correspond to respective values of a second attribute of the items.

Typically, the selected field contains the multiple terms as unstructured data, without an identification of respective attributes of the items to which the terms correspond.

In a disclosed embodiment, identifying a multi-term pattern among the terms in the selected field, wherein the at least first and second terms include the multi-term pattern as one of the values of the attribute.

In some embodiments, the method includes cleansing the terms in the selected field so as to make an association between one of the terms that occurs among the records with a frequency less than a given threshold and the first term, and to determine, responsively to the association, that the one of the terms represents the first value of the attribute. Typically, the terms include characters, and cleansing the terms includes computing a measure of correlation between the one of the terms and the first term responsively to a difference between the characters in the one of the terms and the first term, and deciding whether the one of the terms represents the first value of the attribute responsively to the correlation.

There is also provided, in accordance with an embodiment of the present invention, apparatus for processing information, including:

a memory, which is configured to store a set of records, which include a plurality of fields containing data regarding respective items; and a processor, which is configured to select a field that occurs in all of the records and contains multiple terms in each of the records, to identify at least first and second terms that occur among the terms in the selected field in the records, such that the records are partitioned into at least first and second respective subsets by occurrences of the at least first and second terms in the selected field, to determine responsively to partitioning of the records by the occurrences, that the at least first and second terms correspond to at least first and second different values of an attribute of the items, and to classify the data according to the values of the attribute.

There is additionally provided, in accordance with an embodiment of the present invention, a computer software product, including a computer-readable medium in which program instructions are stored, which instructions, when read by a computer, cause the computer to receive a set of records, which include a plurality of fields containing data regarding respective items, to select a field that occurs in all of the records and contains multiple terms in each of the records, to identify at least first and second terms that occur among the terms in the selected field in the records, such that the records are partitioned into at least first and second respective subsets by occurrences of the at least first and second terms in the selected field, to determine responsively to partitioning of the records by the occurrences, that the at least first and second terms correspond to at least first and second different values of an attribute of the items, and to classify the data according to the values of the attribute.

The present invention will be more fully understood from the following detailed description of the embodiments thereof, taken together with the drawings in which:

DETAILED DESCRIPTION OF EMBODIMENTS

Figure 1:
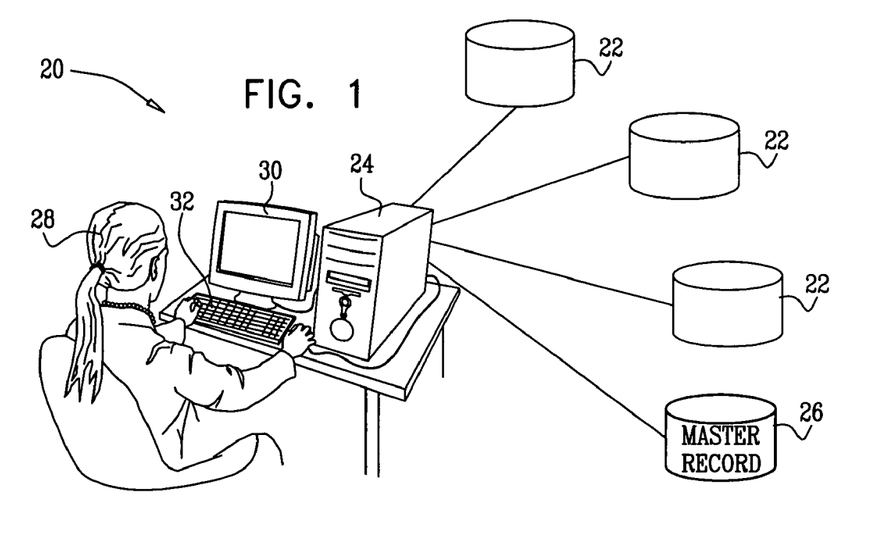
FIG. 1 is a block diagram that schematically illustrates a system for data mastering, in accordance with an embodiment of the present invention.

FIG. 1 is a block diagram that schematically illustrates a system 20 for data mastering, in accordance with an embodiment of the present invention. A record processor 24 reads data records from one or more source repositories 22, processes the records to normalize the data and eliminate duplication and errors, and then writes clean master data to a master repository 26. Typically, repositories 22 and 26 comprises databases. More generally, however, these repositories may comprise data structures of other types, as well as unstructured data. Processor 24 typically comprises a general-purpose computer, which is programmed in software to carry out the functions described herein. The software may be downloaded to the processor in electronic form, over a network, for example, or it may alternatively be provided on tangible media, such as magnetic, optical or electronic memory media.

One of the operations performed by processor 24 is automated detection of attributes in unstructured data that occur in the data records. Product records, for example, typically contain complex and variable data of this type. As described hereinbelow, processor 24 automatically extracts groups of terms that appear to have similar meaning from among the terms in data fields that contain descriptive text. (In the context of the present patent application and in the claims, "text" refers to strings of alphanumeric characters, which may include substantially any arrangement of letters, digits, and other symbols.) The processor treats each such group as an attribute of the items to which the records correspond. These attributes may take on values given by the terms in the group.

For example, processor 24 may extract the following attributes from the descriptive text in a set of product records:

"Model"—corresponding to the group of terms {Lamp, Cable, Antenna, ... }.

"Material"—corresponding to the group of terms {Plastic, Glass, Aluminum, Metal, Wood, Brass, ... }.

"Color"—corresponding to the group of terms {White, Black, Red, Green, Yellow, ... }.

"Diameter"—corresponding to the pattern "[D] cm" or "[D] in".

"Weight"—corresponding to the pattern "[D] kg" or "[D] lbs".

Here [D] denotes any numerical value. The terms in a given group may also be characterized by a certain structure, such as the size attribute "[D]×[D]×[D]" (i.e., "length×width×height").

In detecting the attributes, processor 24 typically uses a set of training data, in the form of records containing the text field from which the attributes are to be derived. The processor finds patterns and groups of terms in the training data and presents these patterns and groups to a user 28 via a user interface, which typically comprises an input device, such as a keyboard 32 or a mouse (not shown), and an output device, such as a monitor 30. The user is thus able to indicate which patterns and groups to retain for use in subsequent processing and which to ignore, as well as to input names for the attributes that are to be used.

After the attributes and values have been identified in this manner, processor 24 may use these extracted terms in normalizing and standardizing the data in source repositories 22. These functions of the processor may be carried out in conjunction with other, data mastering functions, such as those described in U.S. patent application Ser. No. 11/649,540 and in U.S. patent application Ser. No. 11/649,546, both filed Jan. 3, 2007. Both of these application are assigned to the assignee of the present patent application, and their disclosures are incorporated herein by reference.

For convenience and clarity, embodiments of the present invention are described hereinbelow with reference to system 20 and the data mastering functions of this system. The principles of these embodiments, however, may also be applied, mutatis mutandis, in other areas in which data normalization and classification are used.

Figure 2:
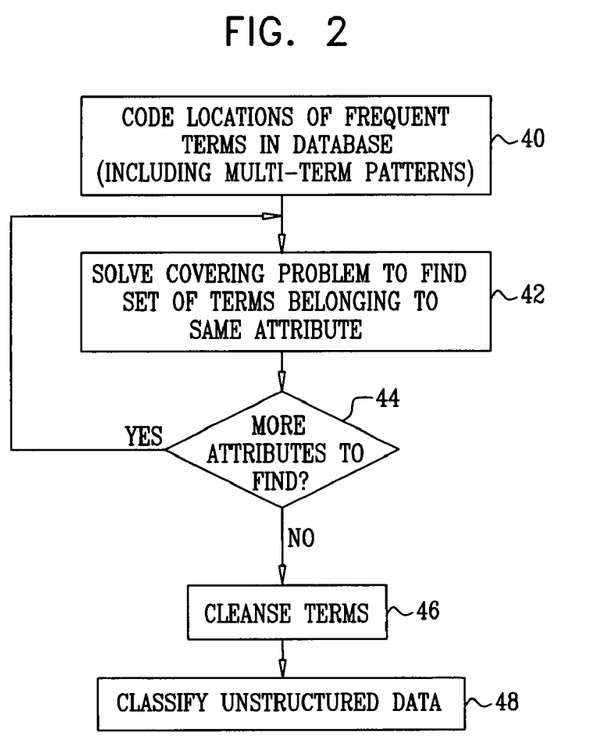
FIG. 2 is a flow chart that schematically illustrates a method for classifying data records that contain unstructured data, in accordance with an embodiment of the present invention.

FIG. 2 is a flow chart that schematically illustrates a method for classifying data records that contain unstructured data, in accordance with an embodiment of the present invention. This method is based on the realization that only one value of a given attribute typically appears in each record. Therefore, if a group of terms appearing in a set of records all represent values of the same attribute, then the records that contain one of the terms in the group will generally not contain any of the other terms in the group. For example, assuming each item may be characterized by a single color, then each record will contain only one of the terms {black, white, red, ... }. If such a group of terms is found, then the terms in the group will partition the set of records into disjoint subsets, such that the records in each subset contain one of the terms in the group.

Based on this rationale, system 20 attempts to solve the problem of identifying groups of terms in fields of source repositories 22 that contain unstructured text, in which the attributes to which the terms belong are not necessarily specified in advance. For this purpose, processor 24 finds relatively small groups of terms that approximately partition the set of records in this manner, and thus identifies these groups of terms as values of the same attribute (subject to confirmation by user 28). The task of finding a small group of terms of this sort is similar in its nature and solution to the mathematical set covering problem.

User 28 initiates the method of FIG. 2 by inputting a set of training data to processor 24, typically by identifying the training data in one of source repositories 22 or in another location. The training data typically comprise a set of data records that contain at least one field of unstructured data, which may be identified by the user as the source for the procedure that is to follow. In preparation for attribute detection, processor 24 codes the locations of frequent terms that occur in the field in question, at a coding step 40. As part of this step, the processor identifies frequent multi-term patterns, and treats these patterns subsequently as individual (compound) terms. The result of step 40 is a map, typically in the form of a vector for each frequent term, showing the records in which the term occurs. This step is described in greater detail hereinbelow with reference to FIG. 3.

Processor 24 uses the map generated at step 40 in finding a group of terms that may be values of the same attribute, at a term grouping step 42. As noted earlier, this step bears a resemblance to the solution of the set covering problem. The processor attempts to find the smallest group of the frequent terms that will optimally partition the largest possible set of the records. In the context of the present patent application and in the claims, a group of terms is considered to "optimally partition" a set of records if all the records in the set contain (at least) one of the terms in the group, while minimizing the subset of the records that contain more than one of the terms. Details of step 42, including criteria that may be used in quantitatively defining optimal coverage, are described hereinbelow with reference to FIG. 4.

After a certain group of terms has been classified as values of a given attribute at step 42, processor 24 revises the map of term occurrence to remove these terms from further consideration. It then processes the frequent terms remaining in the map in order to determine whether any more attributes remain to be found, at a new attribute consideration step 44. Typically, if there is more than one frequent term that has not yet been classified as an attribute value, the processor returns to step 42 and repeats the covering procedure until it cannot find any more groups of terms that optimally cover the set of records. Optionally, the processor may prompt user 28 to manually classify any remaining frequent terms that could not classified automatically.

When all possible frequent terms have been grouped as attribute values in this manner, processor 24 cleanses the remaining (infrequent) terms, at a cleansing step 46. The purpose of this step is to identify erroneous and other anomalous terms in the field in question among the records in the training set and to classify these terms, when possible, as values of the attributes identified at step 42. Generally speaking, the processor attempts to associate each infrequent terms with a syntactically-similar frequent term. Upon making such an association, the processor may conclude that the infrequent term is an erroneous representation of the frequent term and may correct the infrequent term accordingly. Details of step 46 are described hereinbelow with reference to FIG. 5.

At the conclusion of step 46, processor 24 will have derived a list of attributes corresponding to the field of unstructured data in the training set, and will have classified each of the terms appearing in the field as a value of one of the attributes (with the possible exception of certain terms that were found to be unclassifiable and may remain as values of a generic "description" attribute). These attributes and term classifications may then be applied by processor 24, or by another processor, in normalizing and classifying the records in the training set, as well as in normalizing and classifying other records containing unstructured data in source repositories 22, at a data classification step 48. The classified data may be output to user 28, via monitor 30, for example, in response to a query or other sorting criteria specified by the user or by another application program, and may similarly be output to master repository 26.

As a result of the process described above, the records in master repository 26 will share the same set of attributes and the same ranges of attribute values, and thus may be sorted and searched accurately and reliably. The unstructured data are transformed into a coherent database structure in a clear and intelligible form. This structure facilitates the application of machine learning and data mining techniques, as are known in the art, in order to perform intelligent data analysis and to extract regularities and useful knowledge.

Figure 3:
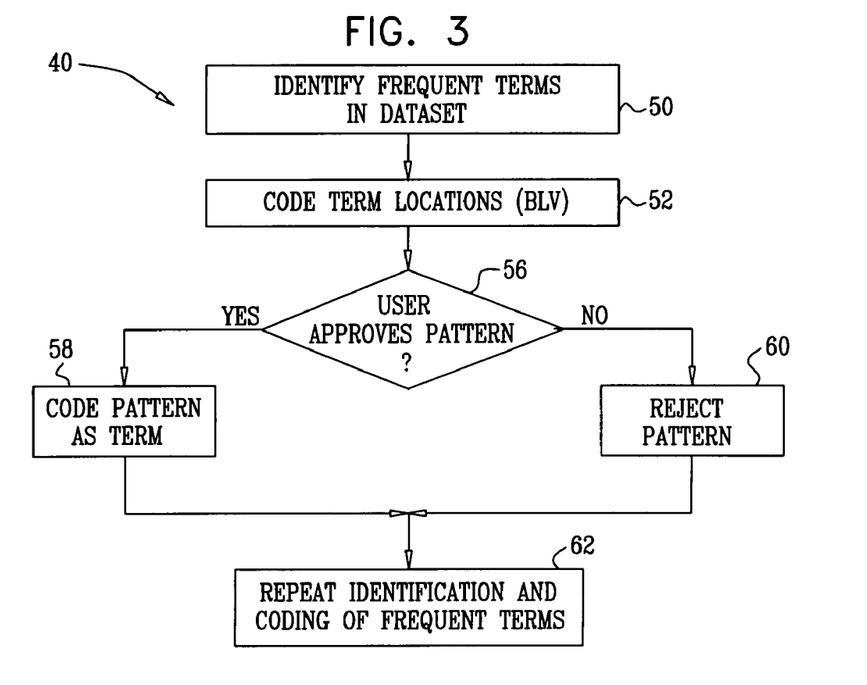
FIG. 3 is a flow chart that schematically illustrates a method for coding term occurrences, in accordance with an embodiment of the present invention.

FIG. 3 is a flow chart that schematically shows details of coding step 40, in accordance with an embodiment of the present invention. In order to carry out this step, processor 24 identifies the frequent terms in the dataset (i.e., the terms in the specified field of the records in the training set), at a frequent term identification 50. For example, a term may be considered "frequent" if it occurs no less than five times in the dataset, or if it occurs in at least 0.5% of the records, whichever is larger. The processor then codes the locations of the frequent terms, at a location coding step 52. This coding maps the records in which each term appears in a manner that permits the processor to efficiently determine term locations in subsequent processing. For this purpose, the processor may conveniently use Boolean location vectors (BLVs). For any given term and a set of N records, the BLV is an array of N bits such that BLV[i]=1 if the term occurs in record i, and BLV[i]=0 otherwise, for i=0, . . . , N−1.

Processor 24 reviews the set of frequent terms in order to find multi-term patterns, at a pattern detection step 54. A multi-term pattern in the present context is a sequence of consecutive terms that occurs relatively frequently in the dataset. The methods used at step 54 are based on detection of association rules among the terms that have at least a certain minimum support ($N_{min}$) and minimum confidence level ($P_{min}$). The patterns may relate to two consecutive terms or to a larger number of consecutive terms, up to a certain maximum number ($k_{max}$). A "term" in this context may be an alphabetic string, a symbol, or a number, wherein all numbers are represented by the same code for the purposes of the present method. Other methods for detection of multi-term patterns, which may be used together with or instead of the methods described herein, are described in detail in the above-mentioned U.S. patent application Ser. No. 11/649, 540.

The association rules for two-term patterns have the following general form:

1. If $t_j$ is the second term in a two-term sequence, then the first term in this sequence is $t_i$ with probability $$p = \frac{m_{ij}}{n_j}.$$

2. If $t_i$ is the first term in a two-term sequence, then the second term in this sequence is $t_j$ with probability $$p = \frac{m_{ij}}{n_i}.$$

Here $m_{ij}$ is the number of occurrences of the sequence ($t_i$, $t_j$), while $n_i$ and $n_j$ are the numbers of occurrences of $t_i$ and $t_j$, respectively.

The association rules for multi-term patterns may be defined as follows:

1. If $t_{i_2}, \ldots, t_{i_k}$ is the sequence of (k−1) terms in a k-term sequence, then the first term in the k-term sequence is $t_{i_1}$ (i.e., $t_{i_1}$ precedes $t_{i_2}, \ldots t_{i_k}$) with probability $$p = \frac{m_{i_1 i_2 \ldots i_k}}{m_{i_2 \ldots i_k}}.$$

2. If $t_{i_1}$ is the first term in a k-term sequence, then the second and subsequent terms this sequence are $t_{i_2}, \ldots, t_{i_k}$ with probability $$p = \frac{m_{i_1 i_2 \ldots i_k}}{n_{i_1}}.$$

Here $n_{i_1}$ is the number of occurrences of $t_{i_1}$, $m_{i_2} \ldots i_k$ is the number of occurrences of the sequence ($t_{i_2}, \ldots, t_{i_k}$), and $m_{i_1 i_2} \ldots i_k$ is the number of occurrences of the sequence $t_{i_1}, t_{i_2}, \ldots, t_{i_k}$).

For example, assume the training dataset contains 10,000 records, and the above-mentioned three parameters are specified as follows:
$N_{min}$=50;
$P_{min}$=0.9;
$k_{max}$=6.

We further assume that the term "New" occurs 300 times in the field in question ($n_i$=300), "York" occurs 100 times ($n_j$=100), and the sequence of these terms (New, York) occurs 97 times ($m_{ij}$=97). In this case, the processor will find the following association rule:

If "York" is the second term in a two-term sequence, then the first term in this sequence is "New" with probability p=0.97 and support N=97.

Thus, the processor will identify the multi-word term "New York".

As another example, assume that the symbol $ occurs in 500 records ($n_i$=500), a number appears in all records ($n_j$=10000), and the symbol $ is located in front of a number in 490 records, i.e., $m_{ij}$=490. In this case the processor will find the following association rule:

If $ is the first term in a two-term sequence, then the second term in this sequence is a number with probability p=0.98 and support N=490.

This association rule defines the existence of the pattern "$ [D]", wherein [D] denotes any number.

Processor 24 presents the multi-term patterns that it finds to user 28, typically by displaying the patterns on monitor 30, at a user approval step 56. The purpose of this step is to avoid coding spurious patterns that may give misleading results in subsequent attribute detection. If the user approves a given multi-term pattern, processor 24 identifies the occurrences of the pattern in the dataset, and replaces the individual term codes of the terms making up the pattern with a unique term code identifying the multi-term pattern. On the other hand, if the user rejects a given pattern at step 56, the processor will record the pattern as having been rejected, at a rejection step 60, and will not change the coding of the component terms.

After coding all the multi-term patterns at step 58, processor 24 modifies the map of term locations, at a location recoding step 62. At this step, the processor repeats the identification of frequent terms and mapping of their locations, as described above at steps 50 and 52, but now subject to the inclusion of multi-term patters as terms (and possibly the exclusion of some single terms that have been subsumed in multi-term patterns, such as "York" in the first example listed above).

Figure 4:
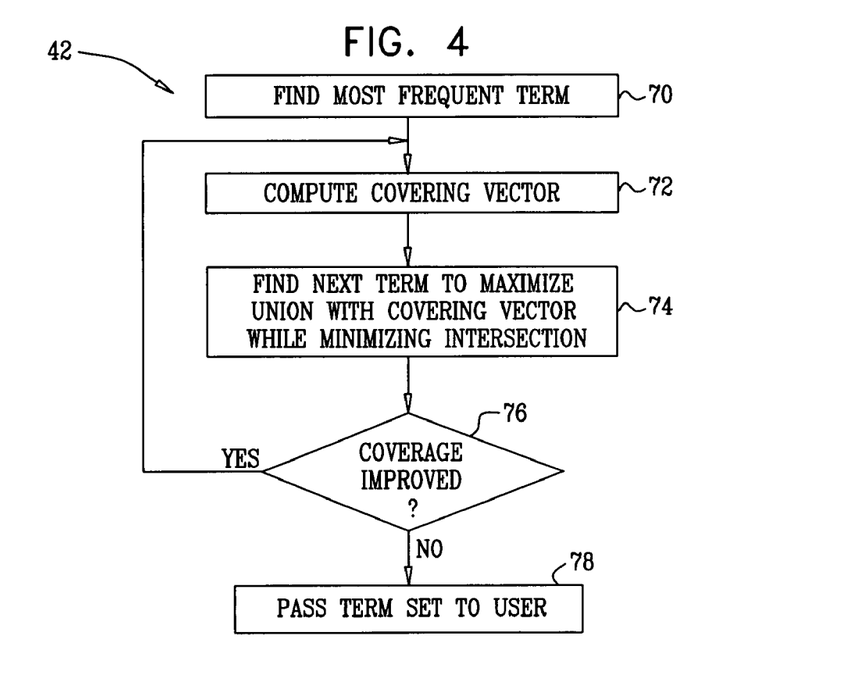
FIG. 4 is a flow chart that schematically illustrates a method for detection of attributes in a set of records, in accordance with an embodiment of the present invention.

FIG. 4 is a flow chart that schematically shows details of term grouping step 42, in accordance with an embodiment of the present invention. In this step, the processor 24 builds a group of terms that optimally partition the dataset, as explained above, by adding terms to the group one by one. The processor uses a covering vector, B_cur[i], i=0, . . . , N−1, to keep track of the records that are covered by the current group of terms, i.e., the set of records that contain at least one of the terms in the group. Processor 24 begins by finding the term that has the highest frequency and has not been assigned to a previous group, at a first term selection step 70. The processor records the code of this first term in an array containing the codes of terms in the group that is under construction. It computes the initial value of the covering vector by setting B_cur[i] equal to the BLV of the first term, at a covering computation step 72. The first term, as well as each subsequent term that is added to the array, is marked as "occupied."

Processor 24 now searches the set of "unoccupied" terms to find the next term to add to the group, at a term searching step 74. The processor evaluates these terms to find the one that will most optimally partition the records in the dataset, in the sense of maximizing the union between B_cur and the BLV of the term under evaluation, while minimizing the intersection. (In other words, the processor attempts to maximize the number of records covered by the group of terms, as represented by the number of ones in the union of the vectors, while minimizing the number of records containing two or more of the terms in the group, represented by the intersection.) This criterion may be expressed as maximization of a covering metric:

$$\max_j (|B\_cur \vee B_j| - a * |B\_cur \& B_j|)$$

wherein $B_j$=B[i] [j], i=0, . . . , N−1) is the BLV of term j, and |V| is the number of ones in the vector V. The operator "&" represents bitwise AND, i.e., intersection. The parameter a is determined heuristically and may be set, for example, to a=10.

After choosing a term $j_0$ in this manner at step 74, processor 24 checks whether this term has actually improved the coverage of the set of records, at a coverage checking step 76. For this purpose, the processor may evaluate the covering metric |B_cur $\vee$ $B_j$|−a*|B_cur & $B_j$|. If the value is positive, coverage is considered to have improved. In this case, the processor adds $j_0$ to the array of term codes in the current group and returns to step 72 to compute the new covering vector B_cur=B_cur $\vee$ $B_{j_0}$. The processor continues to iterate through steps 72-76 in this manner until the best remaining unoccupied term that it can find gives a negative value of the covering metric.

At this point, the processor considers the current group of terms to be complete, and presents the group to user 28 at a group presentation step 78. The user has the option of accepting the group as representing values of a valid attribute, or rejecting the group. In the former case, the user may also record the name of the attribute and may prune one or more terms from the group if they do not correspond to the attribute in question.

As an example of the process described above, assume that the training dataset contains 10,000 records, and at a certain step of the iteration, the current covering vector B_cur contains 6000 ones, i.e., the current group of terms covers 6000 records. The processor finds three terms $j_1, j_2, j_3$ for which the value of the covering metric is positive. Term $j_1$ has no "intersection" with B_cur, and together with B_cur covers 6400 records; $j_2$ has 20 intersecting records with B_cur, and together they cover 6420 records; and $j_3$ has 100 intersecting records with B_cur, and together they cover 6300 records. For term $j_1$ the value of the covering metric is 6400; for $j_2$ it is 6420−10*20=6220; and for $j_3$ it is 6300−10*100=5300. Therefore, at this iteration, the processor chooses $j_1$.

Alternatively, processor 24 may carry out step 74 interactively with user 28. In this case, at the ith iteration, $i \geq 2$ (having found i−1 terms in the previous iterations), the processor finds the best M terms $\{T_1^{(i)}, \ldots, T_M^{(i)}\}$ and sorts them in descending order of the respective increments $\{\Delta C_1^{(i)}, \ldots, \Delta C_M^{(i)}\}$ that they will engender in the covering metric presented above. The processor presents the sorted terms, and optionally the corresponding increments, to the user beginning with $T_1^{(i)}$. If the user approves the term $T_1^{(i)}$, then the term is added to the current group of i−1 terms, and the processor proceeds to the next iteration. Otherwise, if the user rejects $T_1^{(i)}$, the processor presents the next term $T_2^{(i)}$ for user approval. This interaction may proceed through all the terms until the processor reaches $T_M^{(i)}$. At this point, or optionally at any earlier point in the procedure, the user may determine that all the values for the current attribute have been identified, and may instruct the processor accordingly, so that the method proceeds to step 78 without further search.

It is not necessary that the group of terms found at a given iteration through the method of step 4 cover all the records in the training set. For example, the group of colors {red, yellow, green, . . . } may partition the training set into corresponding subsets that together contain only 9000 of the 10,000 records. In this case, when processor 24 creates a "color" field in the records at step 48, the 9000 records that were found to contain a "color" term will have that term listed as the value of the color attribute, while the remaining records will have a null value in the color field.

Figure 5:
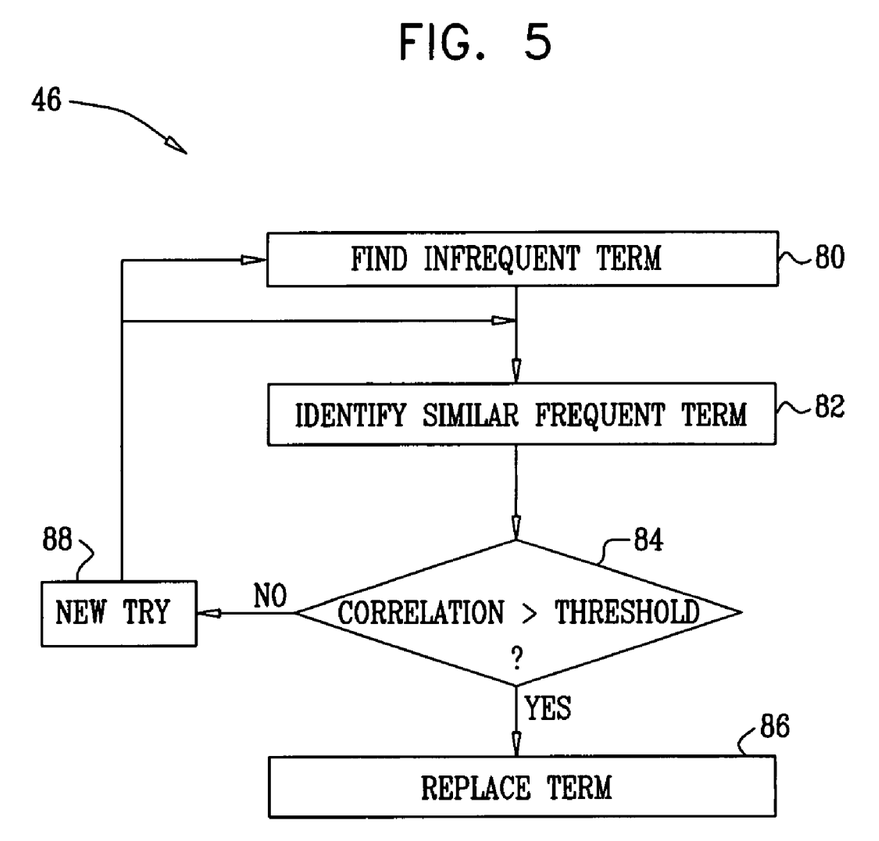
FIG. 5 is a flow chart that schematically illustrates a method for data cleansing, in accordance with an embodiment of the present invention.

FIG. 5 is a flow chart that schematically shows details of cleansing step 46, in accordance with an embodiment of the present invention. As noted earlier, processor 24 begins the method of FIG. 5, after all of the identifiable groups have been found, by finding less frequent terms, at an infrequent term identification step 80. These infrequent terms may comprise, for example, "remainder" terms in the records of the training dataset, which were not assigned to any of the attribute groups in successive passes through step 42 (FIG. 2). Alternatively or additionally, the procedure may be applied in order to correct potentially erroneous terms within a given attribute group.

For the latter purpose, let $\{T_1, \ldots, T_n\}$ be the set of n terms in a given attribute group. For each term $T_i$, processor 24 computes the corresponding frequency $Q_i$ of the term within the attribute group and sorts the terms in descending order of their frequencies. In other words, if $Q_1, Q_2, \ldots, Q_n$ is the sorted sequence of frequencies for terms $T_1, T_2, \ldots, T_n$ respectively, then $Q_i \geq Q_{i+1}$ for i=1, . . . , n−1. The processor identifies one subset of the n terms that contains the most frequent terms, i.e., the terms for which $Q_i \geq \overline{Q}+2*\sigma$, wherein $\overline{Q}$ is the mean frequency, and $\sigma$ is the standard deviation, and another subset containing the least frequent terms, for which $Q_i \leq \overline{Q}−2*\sigma$.

Alternatively, the processor may designate two boundary values:

SBF—significant boundary frequency;

LBF—low boundary frequency.

The subset of most frequent terms contains the terms that satisfy the condition $Q_i \geq SBF$, while the subset of the least frequent terms contains terms with $Q_i \leq LBF$. SBF and LBF may be defined as follows:

$$SBF = \max(k_s * \overline{Q}, f_s);$$

$$LBF = \min(k_l * \overline{Q}, f_l);$$

wherein $k_s$, $k_l$, $f_s$, $f_l$ are parameters, for example, $k_s=5$; $k_l=0.5$; $f_s=100$; and $f_l=10$. Alternatively, the processor may use other parameter values, as well as other definitions of the boundary frequencies.

For each infrequent term identified at step 80, processor 24 searches for a similar term among the frequent terms, at a similarity identification step 82. For example, terms that comprise strings of characters may be considered to be "similar" for this purpose if the distance between the strings is 1. The distance between strings A and B is 1 if they differ by one character in one of the following ways:

Case 1. One character is included in the string A and is absent from the string B, or vice versa, for example, Moscow-Moscaow or Jerusalem-Jrusalem.

Case 2. Two adjacent characters in one string appear in reverse order in the other string, for example, Moscow-Mocsow.

Case 3. A character in one string is replaced by another character in the same position in the second string, for example, Moscow-Moscaw.

Alternatively, the processor may use other distance measures, as well as similarity criteria that permit distances of 2 or greater, as described, for example, in the above-mentioned U.S. patent application Ser. No. 11/649,546.

After finding a frequent term that is similar to the current infrequent term, processor 24 may check the degree of correlation between the infrequent and frequent terms, at a correlation computation step 84. The correlation may take into account various aspects of the difference between the terms, such as the position of the difference (beginning of the word or later in the word) and the correspondence between the differing letters or letter groups that appear in the terms.

For example, the position of the difference may be expressed by a factor a(i), wherein i is the position of difference between terms (i=1, . . . , n), counted from the first character in the terms:

| i | a (i) |
|---|---|
| 1 | 1.3 |
| 2 | 1.1 |
| 3 | 1.05 |
| >3 | 1.0 |

Thus, a difference between the first characters in a pair of terms has greatest weight, and the weight decreases with distance from the beginning of the terms.

The correspondence between different letters may be weighted on the basis of tabulations of similar letters, such as a table T1 listing pairs of similar letters (based on soundex, for example, such as {c, k}), and a table T2 listing correspondences of the type {ck, k}, {ph, f}, etc. (Correspondences in T1 are relevant to Case 3 above, whereas correspondences in T2 are relevant to Case 1.) The correspondence between differing letters may be expressed by a factor b, wherein $b=b_0$ if the letters belong to the same subset of letters according to either T1 or T2 (for example, $b_0=0.75$), and b=1 otherwise.

Based on the above factors, processor 24 calculates the correlation coefficient (c) between strings A and B, of respective lengths n and m, at step 84 as follows:

$$c = 1 - \frac{a(i) * b}{((n+m)/2)}$$

If c is greater than a predefined threshold, the processor concludes that the infrequent term identified at step 80 is a misspelled version of the similar frequent term that was found at step 82. The processor then replaces the (erroneous) infrequent term with the corresponding frequent term, at a term replacement step 86.

On the other hand, if the correlation found at step 84 is below threshold, processor 24 may repeat the search for approximately-matching terms, at a retrial step 88. For example, if there are multiple frequent terms that are all similar to the current infrequent term, the processor may return to step 82 to choose one of the other frequent terms, and may then compute the correlation for this term at step 84. Alternatively, the processor may compute the correlation for each one of the frequent terms at the first pass through steps 82 and 84, and may then replace the infrequent term at step 86 with the frequent term that gave the highest correlation. Further alternatively, if there is no frequent term that has a sufficiently high correlation with the current infrequent term, the processor may simply proceed to the next infrequent term, and may leave the current infrequent term without correction and notify the user of the possible anomaly.

Although the data cleansing example described above relates to terms that comprise character strings, processor 24 may also check and cleanse infrequent numerical values. For example, if $\{v_1, v_2, \ldots, v_f\}$ is the set of different values found in the training set for a given numerical attribute, with mean $\bar{v}$ and standard deviation $\sigma$, then values $v_i$ for which $v_i > \bar{v}+3*\sigma$ or $v_i < \bar{v}-3*\sigma$ may be identified as suspected errors. (Alternatively, more severe constraints may be applied, such as $v_i > \bar{v}+4*\sigma$ or $v_i < \bar{v}-4*\sigma$.) In some cases, processor 24 may be able to identify and correct the source of the error, due to a misplaced or missing decimal point, for example, based on comparison with frequent values. In other cases, the processor may refer the suspected errors to user 28.

The above procedure will identify erroneous numerical values that are statistically anomalous, but clearly will not catch all possible errors. Alternatively or additionally, other tools may be used for this purpose, such as methods based on identifying and applying confident associations and relationships between different attributes. Analyses of this sort, however, are beyond the scope of the present patent application.

The methods of data cleansing described above are based solely on syntactic analysis (i.e., on the identity and order of the characters in the terms). Alternatively or additionally, semantic analysis may be used to resolve anomalies of term identification. For example, a dictionary of synonymous terms may be built up by user input and/or by methods of automatic analysis, such as methods that are described in the above-mentioned U.S. patent application Ser. No. 11/649,546. This synonym dictionary may then be used in identifying and normalizing variant terms.

Although the methods described hereinabove relate specifically to processing of database records, the principles of the present invention may similarly be applied to information held in data structures of other types, as well as to appropriate types of unstructured data. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing information, comprising:

receiving a set of records, which comprise a plurality of fields containing data regarding respective items;

selecting a field that occurs in all of the records and contains multiple terms in each of the records;

identifying, by at least one processor in a computer, at least first and second terms that occur among the terms in the selected field in the records, such that the records are partitioned into at least first and second respective subsets by occurrences of the at least first and second terms in the selected field, wherein identifying the at least first and second terms comprises identifying a first group of the terms that are associated with a first attribute of the items;

determining, responsively to partitioning of the records by the occurrences, that the at least first and second terms correspond to at least first and second different values of the first attribute of the items;

after identifying the first group, identifying a second group of the terms, which is disjoint from the first group and partitions the records into different respective subsets from the terms in the first group, and determining that the terms in the second group correspond to respective values of a second attribute of the items; and classifying the data according to the values of the first attribute and outputting the classified data.

2. The method according to claim 1, wherein identifying a first group of the terms comprises identifying a first group of the terms that occur with at least a predetermined frequency among the records such that the terms in the first group optimally partition the records in the set.

3. The method according to claim 2, wherein identifying the first group further comprises computing a metric that increases in response to a union of the at least first and second subsets and decreases in response to an intersection of the at least first and second subsets, and selecting the terms to add to the first group so as to maximize the metric.

4. The method according to claim 1, wherein the selected field contains the multiple terms as unstructured data, without an identification of respective attributes of the items to which the terms correspond.

5. The method according to claim 1, and comprising identifying a multi-term pattern among the terms in the selected field, wherein the at least first and second terms comprise the multi-term pattern as one of the values of the first attribute.

6. The method according to claim 1, and comprising cleansing the terms in the selected field so as to make an association between one of the terms that occurs among the records with a frequency less than a given threshold and the first term, and to determine, responsively to the association, that the one of the terms represents the first value of the first attribute.

7. The method according to claim 6, wherein the terms comprise characters, and wherein cleansing the terms comprises computing a measure of correlation between the one of the terms and the first term responsively to a difference between the characters in the one of the terms and the first term, and deciding whether the one of the terms represents the first value of the first attribute responsively to the correlation.

8. Apparatus for processing information, comprising:
a memory, which is configured to store a set of records, which comprise a plurality of fields containing data regarding respective items; and
a processor, which is configured to select a field that occurs in all of the records and contains multiple terms in each of the records, to identify at least first and second terms that occur among the terms in the selected field in the records, such that the records are partitioned into at least first and second respective subsets by occurrences of the at least first and second terms in the selected field, to compute a metric that increases in response to a union of the subsets and decreases in response to an intersection of the subsets, to identify a group of the terms, comprising the at least first and second terms, that occur with at least a predetermined frequency among the records such that the terms in the group optimally partition the records in the set, wherein the terms to add to the group are selected so as to maximize the metric, to determine responsively to partitioning of the records by the occurrences, that the at least first and second terms correspond to at least first and second different values of an attribute of the items, and to classify the data according to the values of the attribute.

9. The apparatus according to claim 8, wherein the attribute comprises a first attribute and the group of terms comprises a first group of terms associated with the first attribute, and wherein the processor is configured, after identifying the first group of the terms that are associated with the first attribute of the items, to identify a second group of the terms, which is disjoint from the first group and partitions the records into different respective subsets from the terms in the first group, and to determine that the terms in the second group correspond to respective values of a second attribute of the items.

10. The apparatus according to claim 8, wherein the processor is configured to identify a multi-term pattern among the terms in the selected field, wherein the at least first and second terms comprise the multi-term pattern as one of the values of the attribute.

11. The apparatus according to claim 8, wherein the processor is configured to cleanse the terms in the selected field so as to make an association between one of the terms that occurs among the records with a frequency less than a given threshold and the first term, and to determine, responsively to the association, that the one of the terms represents the first value of the attribute.

12. A computer software product, comprising a computer-readable medium in which program instructions are stored, which instructions, when read by a computer, cause the computer to receive a set of records, which comprise a plurality of fields containing data regarding respective items, to select a field that occurs in all of the records and contains multiple terms in each of the records, to identify at least first and second terms that occur among the terms in the selected field in the records, such that the records are partitioned into at least first and second respective subsets by occurrences of the at least first and second terms in the selected field, to determine responsively to partitioning of the records by the occurrences, that the at least first and second terms correspond to at least first and second different values of a first attribute of the items, to identify, after identifying a first group of the terms that are associated with the first attribute of the items, a second group of the terms, which is disjoint from the first group and partitions the records into different respective subsets from the terms in the first group, to determine that the terms in the second group correspond to respective values of a second attribute of the items and to classify the data according to the values of the first attribute.

13. The product according to claim 12, wherein identifying a first group of the terms comprises identifying a first group of the terms that occur with at least a predetermined frequency among the records such that the terms in the first group optimally partition the records in the set.

14. The product according to claim 13 wherein the instructions cause the computer to compute a metric that increases in response to a union of the at least first and second subsets and decreases in response to an intersection of the at least first and second subsets, and selecting the terms to add to the first group so as to maximize the metric.

15. The product according to claim 12, wherein the instructions cause the computer to identify a multi-term pattern among the terms in the selected field, wherein the at least first and second terms comprise the multi-term pattern as one of the values of the first attribute.

16. The product according to claim 12, wherein the instructions cause the computer to cleanse the terms in the selected field so as to make an association between one of the terms that occurs among the records with a frequency less than a given threshold and the first term, and to determine, responsively to the association, that the one of the terms represents the first value of the first attribute.

* * * * *